US008503645B1

United States Patent
Oliver (10) Patent No.: US 8,503,645 B1
(45) Date of Patent: Aug. 6, 2013

(54) SYSTEMS AND METHODS FOR PROVIDING PROTECTION AGAINST A SOLICITATION FOR INFORMATION DURING A TELEPHONE CALL

(75) Inventor: Ian Oliver, Manly Vale (AU)

(73) Assignee: Symantec Corporation, Mountain View, CA (US)

( * ) Notice: Subject to any disclaimer, the term of this patent is extended or adjusted under 35 U.S.C. 154(b) by 206 days.

(21) Appl. No.: 13/083,219

(22) Filed: Apr. 8, 2011

(51) Int. Cl.
*H04M 3/42* (2006.01)

(52) U.S. Cl.
USPC ............ 379/201.01; 379/201.07; 379/201.08; 379/88.22

(58) Field of Classification Search
USPC ............... 379/201.01, 201.07, 201.08, 88.22
See application file for complete search history.

(56) References Cited

U.S. PATENT DOCUMENTS

2010/0175136 A1* 7/2010 Frumer et al. ............... 726/26

FOREIGN PATENT DOCUMENTS

JP 2007323107 * 12/2007

OTHER PUBLICATIONS

Website: http://usa.kasperksy.com/products-services/home-computer-security/mobile-security, Kasperksy Mobile Security 9, Feb. 16, 2011 (1 pg.).

* cited by examiner

*Primary Examiner* — Quynh Nguyen
(74) *Attorney, Agent, or Firm* — Holland & Hart LLP (57) ABSTRACT

A computer-implemented method to provide protection against a solicitation for information during a telephone call is described. A telephone call connection between a target device and a source device is monitored. A determination is made when sensitive information is provided via the target device. Characteristics of the source device are compared with characteristics stored in a first database. A warning message is generated based on the results of the comparison.

16 Claims, 9 Drawing Sheets

SYSTEMS AND METHODS FOR PROVIDING PROTECTION AGAINST A SOLICITATION FOR INFORMATION DURING A TELEPHONE CALL

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often requires human and computer interaction. Users of computer technologies continue to demand an increase in the efficiency of these technologies. Improving the efficiency of computer technologies is always desirable to anyone who uses and relies on computers.

Computing systems may have the capability to engage in an active telephone call. For example, cellular telephones may be considered to be computing systems. In addition, traditional computing systems may engage in an active telephone call with another computing system. In some cases, an entity may initiate a telephone call by dialing a phone number associated with an unsuspecting computing system. During the call, the entity may falsely represent itself as being an entity known and trusted by a user of the computing device. For example, the entity may represent itself as being a bank or other financial institution known to the user. The entity may solicit certain information from the user during the call.

SUMMARY

According to at least one embodiment, a computer-implemented method to provide protection against a solicitation for information during a telephone call is described. A telephone call connection between a target device and a source device is monitored. A determination is made when sensitive information is provided via the target device. Characteristics of the source device are compared with characteristics stored in a first database. A warning message is generated based on the results of the comparison.

In one embodiment, sensitive information may be received via a keypad of the target device prior to the telephone call. The received sensitive information may be encrypted and transmitted to a back-end server. The back-end server may store the sensitive information in a second database.

In one configuration, characteristics of the source device may include a telephone number associated with an entity that originated the telephone call. Characteristics of the source device may include a recording of an automated message provided to the target device during the telephone call.

In one example, characteristics of the source device may be compared with a whitelist of characteristics stored in the first database. Characteristics of the source device may be compared with a blacklist of characteristics stored in the first database. In one example, the sensitive information may be bank account information.

A computing device configured to provide protection against a solicitation for information during a telephone call is also described. The computing device may include a processor and memory in electronic communication with the processor. The computing device may further include a protection module configured to monitor a telephone call connection between a target device and a source device, and determine when sensitive information is provided via the target device. The protection module may be further configured to compare characteristics of the source device with characteristics stored in a first database, and generate a warning message based on the results of the comparison.

A computer-program product for providing protection against a solicitation for information during a telephone call is also described. The computer-program product comprising a non-transitory computer-readable medium having instructions thereon. The instructions may include code programmed to monitor a telephone call connection between a target device and a source device, and code programmed to determine when sensitive information is provided via the target device. The instructions may further include code programmed to compare characteristics of the source device with characteristics stored in a first database, and code programmed to generate a warning message based on the results of the comparison.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Fraudulent scams have been in existence throughout history. With advances to technology, the complexity of these scams has also advanced. A popular scamming technique is to solicit sensitive information via a telephone call.

These attacks may originate unsolicited telephone calls to potential victims. The potential victims may be led to believe that the telephone call originated from a legitimate institution (e.g., bank, credit card company, school, and the like). In one configuration, these types of unsolicited telephone calls may be referred to as fake telephone calls. These attacks may target specific telephone numbers, or these attacks may randomly dial phone numbers in the hopes that (if the institution is large enough) actual clients of the institution may be contacted.

In one example, a scammer may originate an unsolicited telephone call to a potential victim. The scammer may falsely represent the call as originating from a legitimate source, such as the bank used by the victim. As a result, the potential victim may be led to believe that the call is a legitimate call originating from the victim's bank. The fake telephone call may be a recording that interacts with the user or may be a live person falsely representing an agent of the bank or other institution that the victim may be associated with. The victim may be prompted to provide sensitive information (e.g., account numbers, pins, passwords, etc.) during the call. The victim may enter this information via the keypad on the victim's telephone. In addition, the victim may speak this information via the microphone on the victim's telephone. The scammer may capture the information provided by the unsuspecting victim. Once the scammer has acquired this sensitive information, the scammer may then access the accounts of the victim, sell the sensitive information, and the like. In one configuration, the present systems and methods provide protection against attempts to solicit sensitive information from potential victims via fake telephone calls. For example, once personal information is entered via a keypad of a device, or once personal information is requested during a live call, the user may be warned if the other entity participating in the live call is not an authorized entity.

Figure 1:
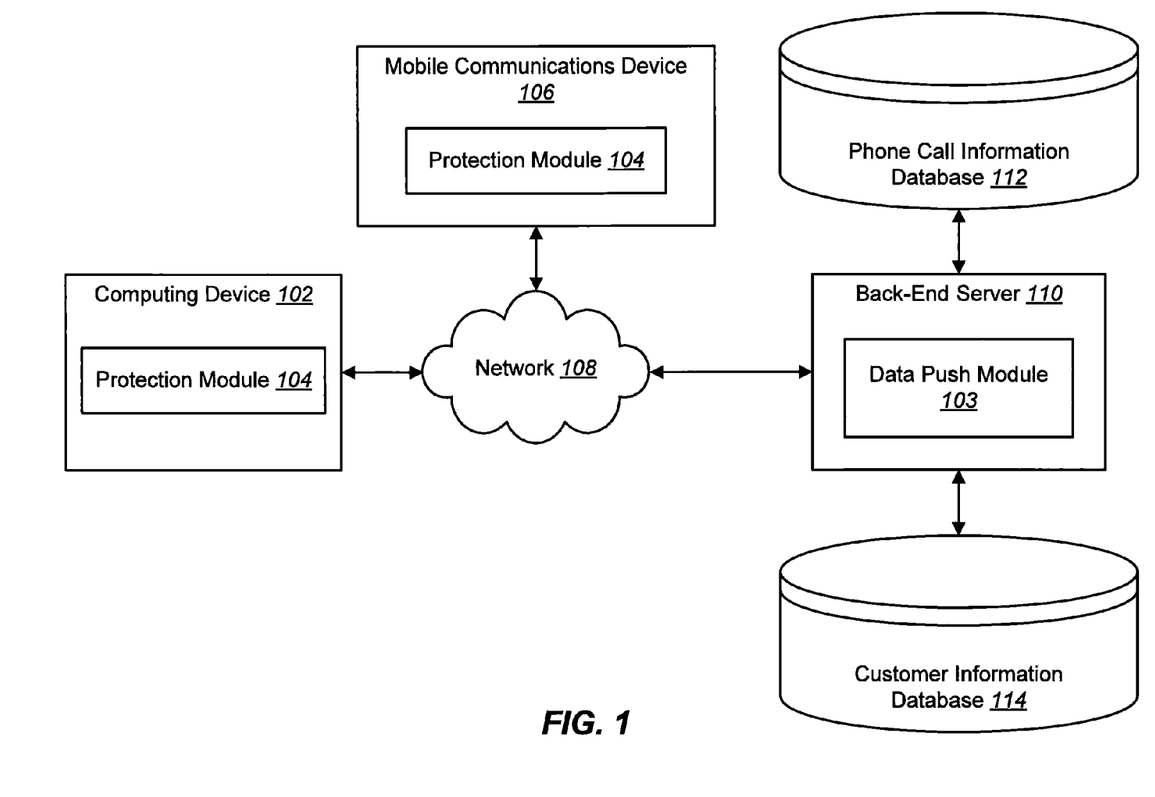
FIG. 1 is a block diagram illustrating one embodiment of an environment in which the present systems and methods may be implemented.

FIG. 1 is a block diagram illustrating one embodiment of an environment in which the present systems and methods may be implemented. In one example, a computing device 102, a mobile communications device 106, and a back-end server 110 may communicate with each other across a network 108 connection. The computing device 102 may be a personal computer (PC), a laptop, a tablet, a personal digital assistant (PDA), a tablet, and the like. The mobile communications device 106 may be a smartphone, a cellular telephone, and the like. The computing device 102 and the mobile communications device 106 may include a protection module 104. In one example, the protection module 104 may provide protection against attempts to solicit sensitive information from users of the computing device 102 and the mobile communications device 106 via fake telephone calls. In one embodiment, a user may input sensitive information via the protection module 104. The protection module 104 may then transmit the received sensitive information to the back-end server 110. The sensitive information received by the back-end server 110 may be stored in a customer information database 114. In one embodiment, the sensitive information may include information for certain institutions associated with the user, such as, but not limited to, banks, schools, credit card providers, mortgage lenders, insurance companies, utilities providers, and the like. The sensitive information may include, but is not limited to, account numbers, pins, passwords, usernames, and the like. In one configuration, the customer information database 114 may store actual credit card information and/or information regarding the format of credit cards. The database 114 may also store actual bank account information and/or information regarding the format of an account for a particular bank. In addition, the database 114 may store private passwords and pins (or a reversible hash of this information) for a user.

In one configuration, the back-end server 110 may also be in communication with a phone call information database 112. The database 112 may store information relating to trusted, un-trusted, and unknown telephone numbers. The back-end server 110 may also include a data push module 103. The module 103 may push data stored in the customer information database 114 and the phone call information database 112 to the protection module 104 on the mobile communications device 106. Details regarding the various modules and components discussed in FIG. 1 will be described below.

Figure 2:
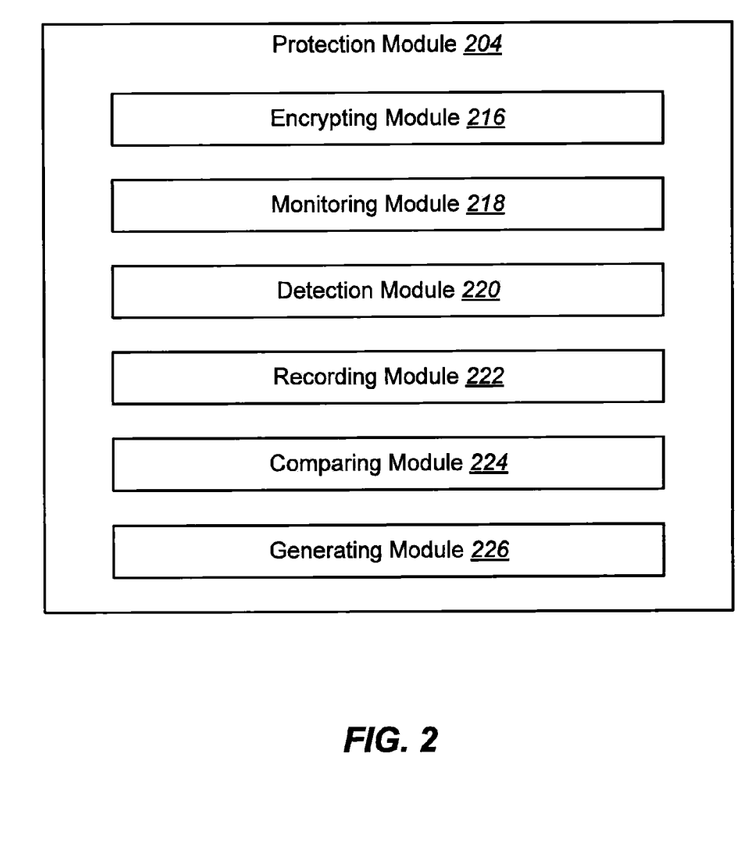
FIG. 2 is a block diagram illustrating one embodiment of a protection module in accordance with the present systems and methods.

FIG. 2 is a block diagram illustrating one embodiment of a protection module 204 in accordance with the present systems and methods. In one configuration, the protection module 204 may include an encrypting module 216, a monitoring module 218, a detection module 220, a recording module 222, a comparing module 224, and a generating module 226.

In one example, a user may access the protection module 204 via the computing device 102 or the mobile communications device 104. The user may input sensitive information via the protection module 204. The encrypting module 216 may encrypt the sensitive information received from the user. The encrypted sensitive information may be transmitted to the back-end server 110 across the network 108 connection. The encrypted sensitive information may be stored in the customer information database 114.

In one configuration, the monitoring module 218 may monitor active telephone calls on the computing device 102 and on the mobile communications device 106. Telephone calls on the computing device 102 may include telephone calls over the Internet using software such as, but not limited to, Skype®. Telephone calls on the mobile communications device 106 may include connections according to, but not limited to, specifications specified by the International Telecommunication Union. In one embodiment, the monitoring module 218 may monitor a keypad of the mobile communications device 106 and the computing device 102 for certain input. In the case of the keypad for the mobile communications device 106, the monitoring module 218 may monitor for the dual-tone multi-frequency (DTMF) tones generated by the activation of the various keys on the keypad of the communications device 106. The monitoring module 218 may also monitor a microphone of the computing device 102 and the mobile communications device 106 for input spoken by the user.

The detection module 220 may detect certain inputs provided by the user during the telephone call. For example, the detection module 220 may detect when account information, pins, passwords, usernames, etc. are provided during the call. The detection module 220 may analyze the user's input that is monitored by the monitoring module 218. The detection module 220 may determine whether the input matches a predefined format indicating that the input may be sensitive information.

In one embodiment, the telephone call may include an automated message played to the user during the call. The detection module 220 may detect when an automated message is being played to the user and the recording module 222 may record the message. The recorded message may then transmitted to the back-end server 110 and stored in the phone call information database 112.

The comparing module 224 may compare sensitive information detected by the detection module 220 with information stored in the customer information database 114 and pushed from the back-end server 110 to the computing device 102 or the mobile communications device 106. The comparing module 224 may also compare characteristics of the source that originated the telephone call (e.g., phone number, automated message being played, etc.) with information stored in the phone call information database 112. For example, the number of the entity participating on the active call with the user may be compared against a whitelist of valid numbers. The whitelist may include valid phone numbers for banks, institutions, and the like. The comparing module 224 may also compare the number of the entity participating on the active call against a blacklist. The blacklist may include phone numbers that are known to be associated with fraudulent entities. In addition, there may be ranges of phone numbers that have a reputation of being associated with fraudulent entities. The comparing module 224 may also compare the number of the entity participating on the active call against a list of numbers provided by the user that may not be included on the whitelist or blacklist.

In one configuration, the generating module 226 may generate a message or other notification to the user based on the results of the comparing module 224. For example, if the comparing module 224 determines that sensitive information inputted by the user matches sensitive information stored in the customer information database 114 and that the characteristics of the source of the telephone call match information stored in the phone call information database 112 for un-trusted sources, the generating module 226 may generate a warning message to the user that the source originating the telephone call is not a trusted source. As a result, the user may be warned that the telephone call is actually a fake telephone call. For example, if the telephone number of the entity on the active call with the user is a number associated with a country outside the country of the user, a warning may be generated. In addition, if the telephone number of the unknown source is not included in the whitelist, the blacklist, or any list provided by the user, the number may be sent for further analysis and a warning may be displayed to the user. In one embodiment, analyzed telephone numbers may be collected. Aggregated data may show a pattern of a particular telephone number attempting to engage an attack with more frequency than another telephone number.

In one embodiment, the sensitive information inputted by the user on the mobile communications device 106 and the computing device 102 may not be transmitted to across the network 108 until the comparing module 224 has performed the comparisons described above. As a result, if the user receives a warning message from the generating module 226 that the telephone call may be a fake telephone call, the user may have the option to cancel the transmission of the sensitive information across the network 108 to the un-trusted source that originated the call.

Figure 3:
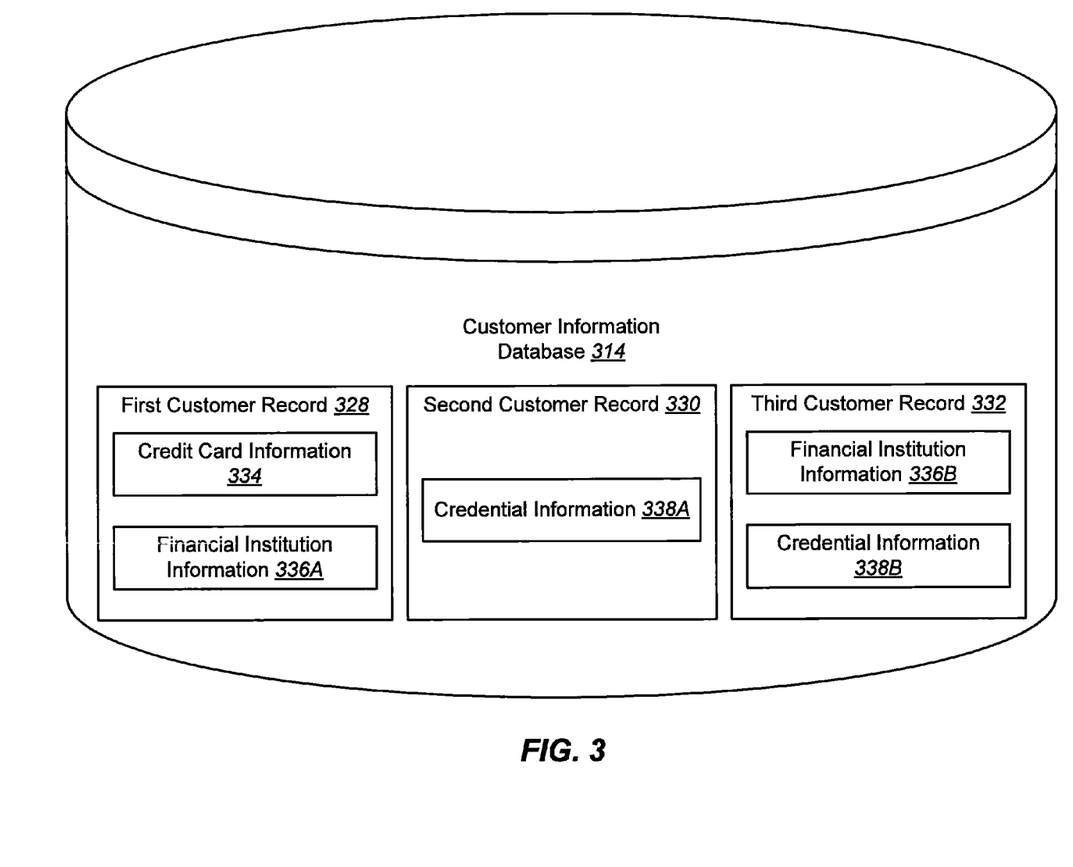
FIG. 3 is a block diagram illustrating one embodiment of a customer information database that may be used in accordance with the present systems and methods.

FIG. 3 is a block diagram illustrating one embodiment of a customer information database 314 that may be used in accordance with the present systems and methods. The database 314 may store one or more customer records 328, 330, 332. Each customer record 328, 330, 332 may correspond to an individual customer or user. In one embodiment, information associated with each customer may be stored in the corresponding customer record 328, 330, 332. For example, a first customer record 328 may be created for a first customer. The first customer record 328 may store information associated with the first customer, such as, but not limited to, credit card information 334 and financial institution information 336A (e.g., bank accounts, passwords, pins, etc.). A second customer record 330 and a third customer record 332 may store information associated with a second customer and a third customer, respectively. Examples of information that may be stored for customers may include, but are not limited to, credential information 338 (e.g., passwords, usernames, etc.), credit card information 334, financial institution information 336, and the like.

In one configuration, the information stored in the customer information database 314 may be the actual sensitive data for a customer. In one example, the information stored in the database 314 may represent a format used for the sensitive data. For example, the credit card information 334 stored for the first customer may be the actual credit card number. In one example, the credit card information 334 may represent a format of the credit card number for the first customer. A customer may input information via the protection module 104 on the computing device 102 and/or the mobile communications device 106. The inputted information may then be transmitted to the back-end server 110 and stored in a record corresponding to the customer in the customer information database 314.

Figure 4:
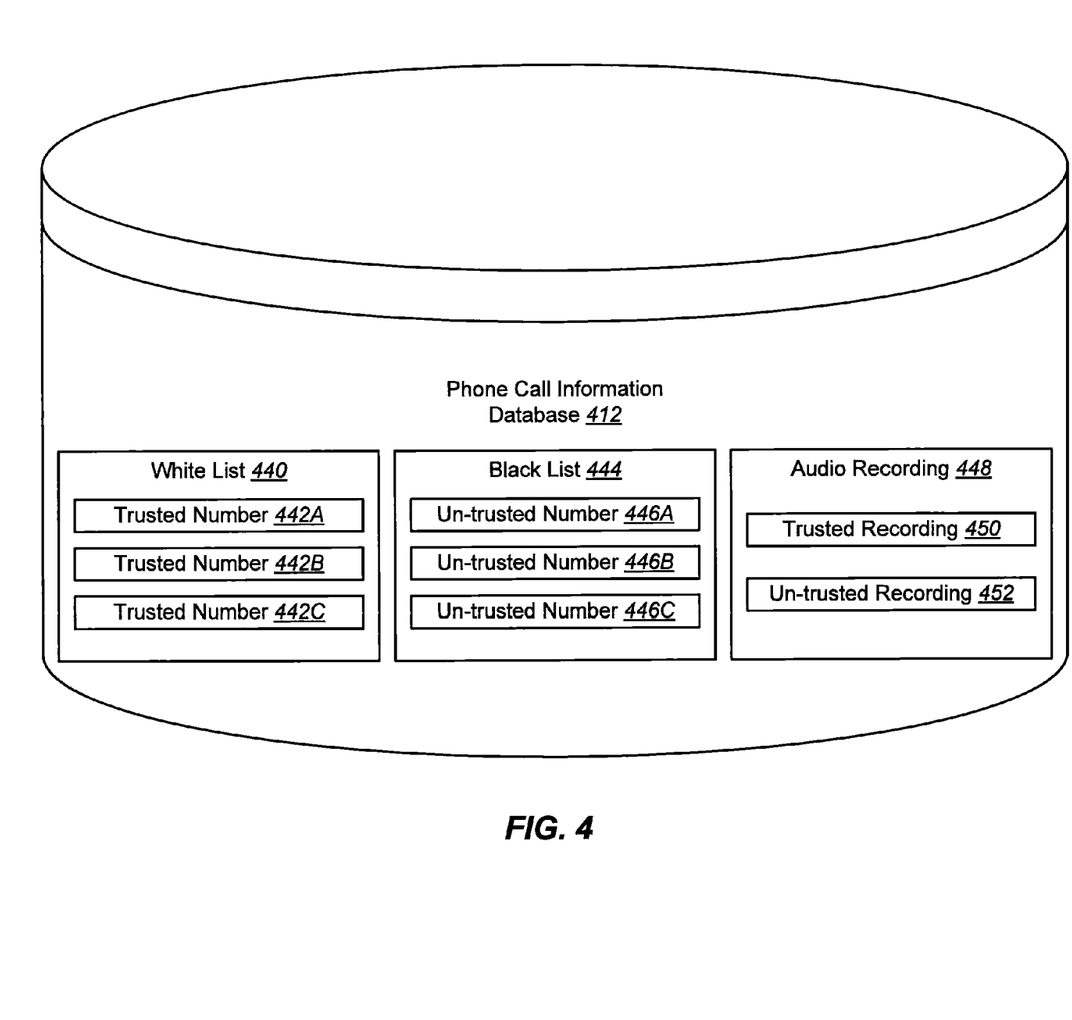
FIG. 4 is a block diagram illustrating one embodiment of a phone call information database that may be used in accordance with the present systems and methods.

FIG. 4 is a block diagram illustrating one embodiment of a phone call information database 412 that may be used in accordance with the present systems and methods. The database 412 may store a whitelist 440, a blacklist 444, and audio recordings 448. In one configuration, the whitelist 440 may include one or more records of trusted telephone numbers 442A, 442B, 442C. The trusted telephone numbers 442A, 442B, 44C may be associated with actual institutions associated with a customer. For example, a trusted number 442A may be the telephone number of a bank that the customer uses. The blacklist 444 may include a list of un-trusted numbers 446A, 446B, 444C. The un-trusted numbers 446A, 446B, 446C may be associated with entities that are known to originate fake telephone calls in an attempt to acquire sensitive information from a customer.

The audio recordings 448 may include trusted recordings 450 and un-trusted recordings 452. A trusted recording 450 may include an automated message that is played to a customer during a telephone call that originated from a trusted source (e.g., bank, school, and the like). An un-trusted recording 452 may be a recording of an automated message associated with an un-trusted source that originates fake phone calls. In one embodiment, the protection module 104 may compare an automated message being played to a customer during an active call with the audio recordings 448 stored in the database 412. If the automated recording playing during the active call matches an un-trusted recording 452 previously stored in the database 412, the protection module 104 may generate a message to the customer to warn the customer that the active call may be a fake telephone call originating from an un-trusted or unknown source.

Figure 5:
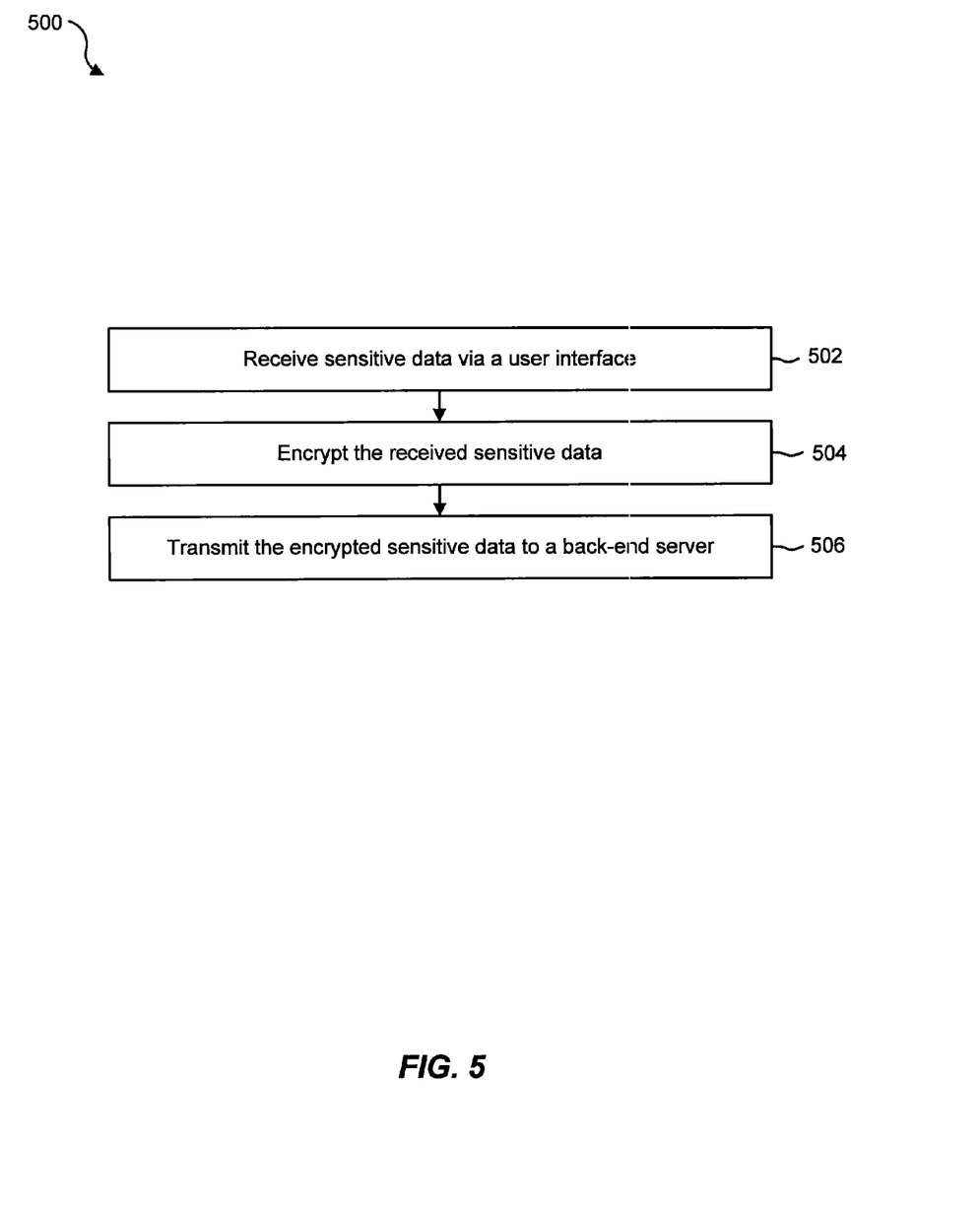
FIG. 5 is a flow chart illustrating one embodiment of a method to provide sensitive data to a back-end server.

FIG. 5 is a flow chart illustrating one embodiment of a method 500 to provide sensitive data to the back-end server 110. In one configuration, the method 500 may be implemented by the protection module 104. In one embodiment, sensitive data may be received 502 via a user interface. For example, the user interface may prompt the user to enter credit card information, bank account information, passwords, usernames, and the like. The received sensitive data may be encrypted 504. In one example, the sensitive data may be hashed in order to encrypt the data. The encrypted sensitive data may be transmitted 506 to the back-end server 110. The back-end server 110 may then store the received sensitive data in the customer information database 114. In one embodiment, the database 114 may store the data in the encrypted form (e.g., a reversible hash) or the database 114 may store the data in a decrypted form.

Figure 6:
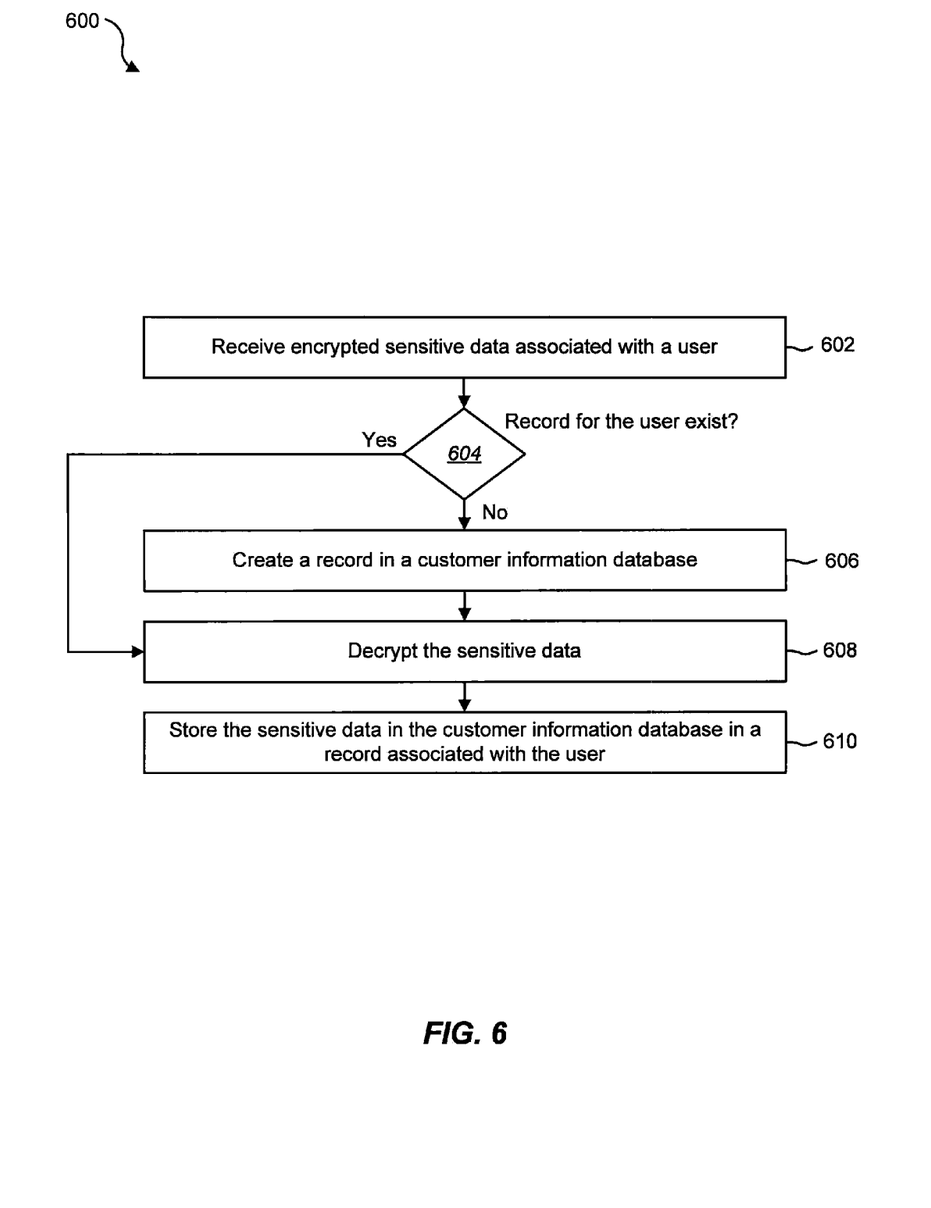
FIG. 6 is a flow chart illustrating one embodiment of a method to process encrypted sensitive data received from the protection module.

FIG. 6 is a flow chart illustrating one embodiment of a method 600 to process encrypted sensitive data received from the protection module 104. The method 600 may be implemented by the back-end server 110.

In one configuration, encrypted sensitive data associated with a user may be received 602. A determination 604 may be made as to whether a record exists for the user. If it is determined 604 that a record does exist for the user, the sensitive data may be decrypted 608. If, however, it is determined 604 that a record does not exist, a record may first be created 606 for the user in the customer information database 114. The sensitive data may be stored 610 in the customer information database 114 in the record associated with the user. In one configuration, the sensitive data may be stored in the database 114 in an encrypted form and the step of decrypting the sensitive data may be skipped.

Figure 7:
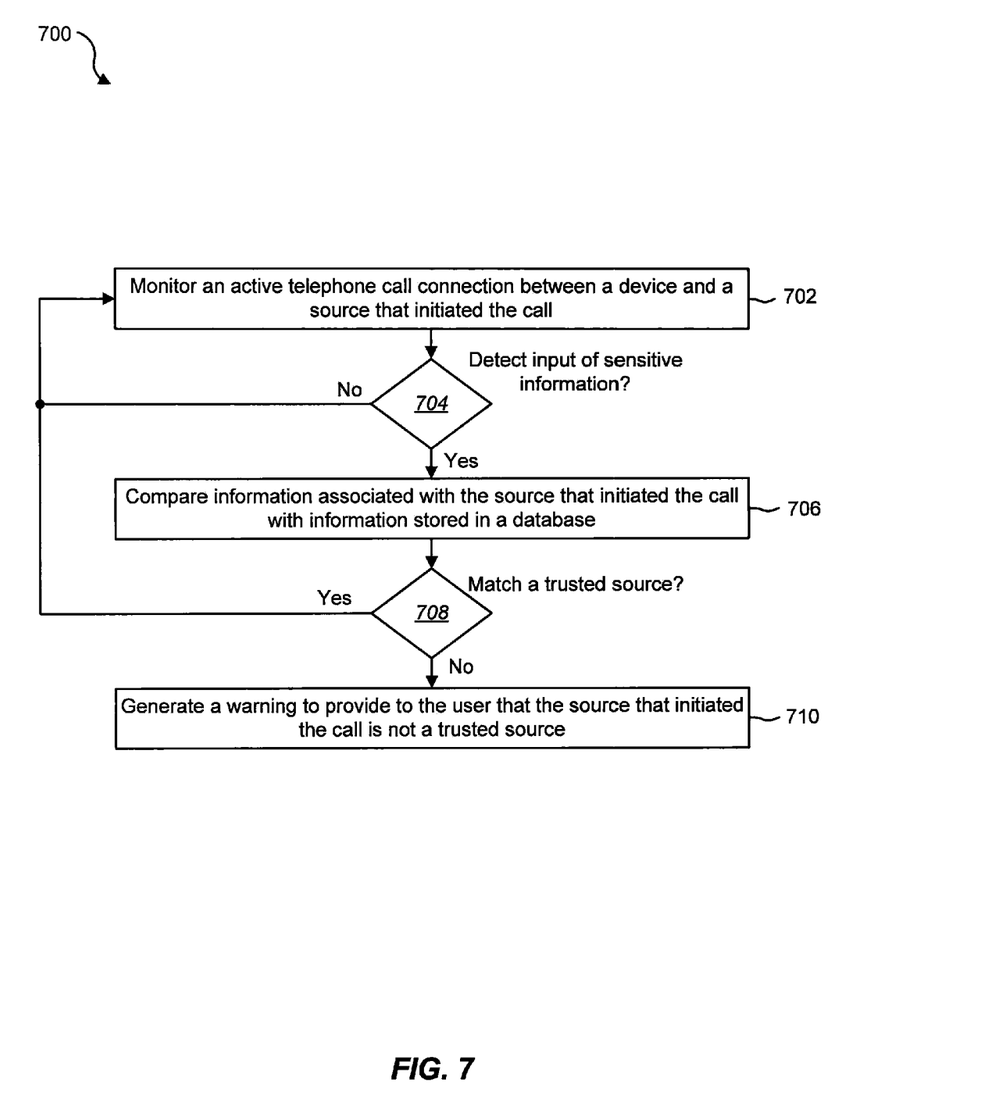
FIG. 7 is a flow chart illustrating one embodiment of a method to provide protection against attempts to solicit sensitive information during a fake telephone call.

FIG. 7 is a flow chart illustrating one embodiment of a method 700 to provide protection against attempts to solicit sensitive information during a fake telephone call. The method may be implemented by the protection module 104.

In one configuration, an active telephone call connection between a device and a source that initiated the call may be monitored 702. The device may be the computing device 102 and/or the mobile communications device 106. A determination 704 may be made as to whether input of sensitive information has been detected. If it is determined 704 that input of sensitive information has not been detected, the method 700 may return to monitor the active telephone call. If, however, it is determined 704 that input of sensitive information has been detected, information associated with the source that initiated the call may be compared 7006 with information stored in the phone call information database 112. A determination 708 may be made as to whether the information associated with the source matches information associated with a trusted source. If it is determined 708 that information associated with the source matches information stored in the database 112, the method 700 may return to continue monitoring the active telephone call. If, however, it is determined 708 that information associated with the source does not match information stored in the database 112 for a trusted source, a warning may be generated 710 and provided to the user that indicates that the source that initiated the telephone call may not be a trusted source. As a result, the user may elect to cancel the submission of the sensitive information.

Figure 8:
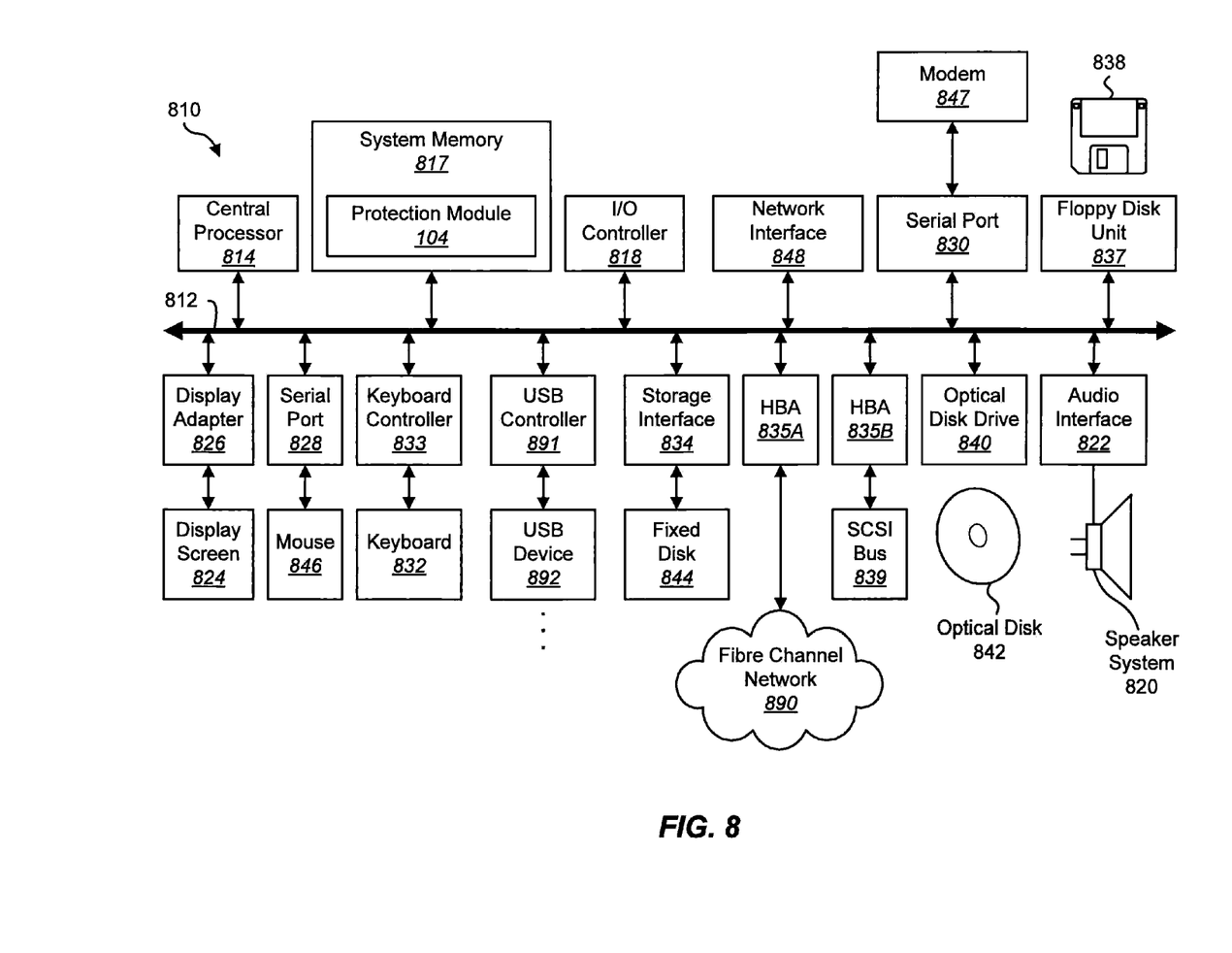
FIG. 8 depicts a block diagram of a computer system suitable for implementing the present systems and methods.

FIG. 8 depicts a block diagram of a computer system 810 suitable for implementing the present systems and methods. Computer system 810 includes a bus 812 which interconnects major subsystems of computer system 810, such as a central processor 814, a system memory 817 (typically RAM, but which may also include ROM, flash RAM, or the like), an input/output controller 818, an external audio device, such as a speaker system 820 via an audio output interface 822, an external device, such as a display screen 824 via display adapter 826, serial ports 828 and 830, a keyboard 832 (interfaced with a keyboard controller 833), multiple USB devices 892 (interfaced with a USB controller 891), a storage interface 834, a floppy disk unit 837 operative to receive a floppy disk 838, a host bus adapter (HBA) interface card 835A operative to connect with a Fibre Channel network 890, a host bus adapter (HBA) interface card 835B operative to connect to a SCSI bus 839, and an optical disk drive 840 operative to receive an optical disk 842. Also included are a mouse 846 (or other point-and-click device, coupled to bus 812 via serial port 828), a modem 847 (coupled to bus 812 via serial port 830), and a network interface 848 (coupled directly to bus 812).

Bus 812 allows data communication between central processor 814 and system memory 817, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the protection module 104 to implement the present systems and methods may be stored within the system memory 817. Applications resident with computer system 810 are generally stored on and accessed via a non-transitory computer readable medium, such as a hard disk drive (e.g., fixed disk 844), an optical drive (e.g., optical drive 840), a floppy disk unit 837, or other storage medium. Additionally, applications can be in the form of electronic signals modulated in accordance with the application and data communication technology when accessed via network modem 847 or interface 848.

Storage interface 834, as with the other storage interfaces of computer system 810, can connect to a standard computer readable medium for storage and/or retrieval of information, such as a fixed disk drive 844. Fixed disk drive 844 may be a part of computer system 810 or may be separate and accessed through other interface systems. Modem 847 may provide a direct connection to a remote server via a telephone link or to the Internet via an internet service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 8 need not be present to practice the present systems and methods. The devices and subsystems can be interconnected in different ways from that shown in FIG. 8. The operation of a computer system such as that shown in FIG. 8 is readily known in the art and is not discussed in detail in this application. Code to implement the present disclosure can be stored in a non-transitory computer-readable medium such as one or more of system memory 817, fixed disk 844, optical disk 842, or floppy disk 838. The operating system provided on computer system 810 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 9:
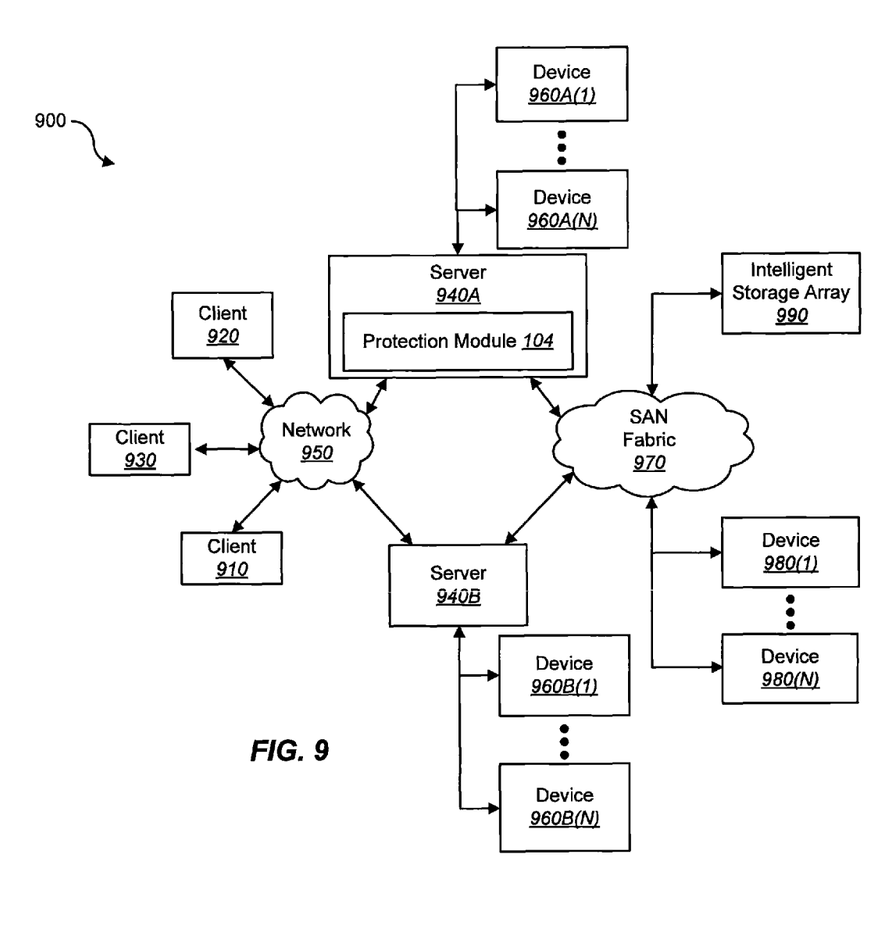
FIG. 9 is a block diagram depicting a network architecture in which client systems, as well as storage servers (any of which can be implemented using computer system), are coupled to a network.

FIG. 9 is a block diagram depicting a network architecture 900 in which client systems 910, 920 and 930, as well as storage servers 940A, 940B (any of which can be implemented using computer system 910), are coupled to a network 950. In one embodiment, the protection module 104 may be located within the storage servers 940A, 940B to implement the present systems and methods. The storage server 940A is further depicted as having storage devices 960A(1)-(N) directly attached, and storage server 940B is depicted with storage devices 960B(1)-(N) directly attached. SAN fabric 970 supports access to storage devices 980(1)-(N) by storage servers 940A, 940B, and so by client systems 910, 920 and 930 via network 950. Intelligent storage array 990 is also shown as an example of a specific storage device accessible via SAN fabric 970.

With reference to computer system 810, modem 847, network interface 848 or some other method can be used to provide connectivity from each of client computer systems 910, 920, and 930 to network 950. Client systems 910, 920, and 930 are able to access information on storage server 940A or 940B using, for example, a web browser or other client software (not shown). Such a client allows client systems 910, 920, and 930 to access data hosted by storage server 940A or 940B or one of storage devices 960A(1)-(N), 960B(1)-(N), 980(1)-(N) or intelligent storage array 990. FIG. 9 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of". In addition, for ease of use, the words "including" and "having," as used in the specification and claims, are interchangeable with and have the same meaning as the word "comprising."

What is claimed is:

1. A computer-implemented method to provide protection against a solicitation for information during a telephone call, comprising:
   monitoring, by a processor, a telephone call connection between a target device and a source device;
   determining, by the processor, when sensitive information is received via the target device;
   encrypting the sensitive information received via the target device;
   comparing, by the processor, characteristics of the source device with characteristics stored in a first database, wherein characteristics of the source device comprise at least a recording of an automated audio message provided to the target device during the telephone call; and
   generating, by the processor, a warning message based on the results of the comparison.

2. The method of claim 1, further comprising receiving the sensitive information via a keypad of the target device prior to the telephone call.

3. The method of claim 1, further comprising transmitting the encrypted sensitive information to a back-end server, wherein the back-end server stores the sensitive information in a second database.

4. The method of claim 1, wherein characteristics of the source device comprise a telephone number associated with an entity that originated the telephone call.

5. The method of claim 1, wherein comparing characteristics of the source device comprises comparing the characteristics of the source device with a whitelist of characteristics stored in the first database.

6. The method of claim 1, wherein comparing characteristics of the source device comprises comparing the characteristics of the source device with a blacklist of characteristics stored in the first database.

7. The method of claim 1, wherein the sensitive information comprises bank account information.

8. A computing device configured to provide protection against a solicitation for information during a telephone call, comprising:
- a processor;
- memory in electronic communication with the processor;
- instructions stored in the memory, the instructions being executable by the processor to:
  - monitor a telephone call connection between a target device and a source device;
  - determine when sensitive information is received via the target device;
  - encrypt the sensitive information received via the target device;
  - compare characteristics of the source device with characteristics stored in a first database, wherein characteristics of the source device comprise at least a recording of an automated audio message provided to the target device during the telephone call; and
  - generate a warning message based on the results of the comparison.

9. The computing device of claim 8, wherein the instructions are executable by the processor to:
- receive the sensitive information via a keypad of the target device prior to the telephone call.

10. The computing device of claim 8, wherein the instructions are executable by the processor to:
- transmit the encrypted sensitive information to a back-end server, wherein the back-end server stores the sensitive information in a second database.

11. The computing device of claim 8, wherein characteristics of the source device comprise a telephone number associated with an entity that originated the telephone call.

12. The computing device of claim 8, wherein comparing characteristics of the source device further comprises instructions executable by the processor to:
- compare the characteristics of the source device with a whitelist of characteristics stored in the first database.

13. The computing device of claim 8, wherein comparing characteristics of the source device further comprises instructions executable by the processor to:
- compare the characteristics of the source device with a blacklist of characteristics stored in the first database.

14. The computing device of claim 8, wherein the sensitive information comprises bank account information.

15. A computer-program product for providing protection against a solicitation for information during a telephone call, the computer-program product comprising a non-transitory computer-readable medium storing instructions thereon, the instructions being executable by the processor to:
- monitor a telephone call connection between a target device and a source device;
- determine when sensitive information is received via the target device;
- encrypt the sensitive information received via the target device;
- compare characteristics of the source device with characteristics stored in a first database, wherein characteristics of the source device comprise at least a recording of an automated audio message provided to the target device during the telephone call; and
- generate a warning message based on the results of the comparison.

16. The computer-program product of claim 15, wherein the instructions are executable by the processor to:
- receive sensitive information via a keypad of the target device prior to the telephone call; and
- transmit the encrypted sensitive information to a back-end server, wherein the back-end server stored the sensitive information in a second database.

* * * * *